(12) United States Patent
Tsai et al.

(10) Patent No.: US 11,920,020 B2
(45) Date of Patent: Mar. 5, 2024

(54) COMPOSITE MATERIAL AND METHOD OF MANUFACTURING THE SAME (71) Applicant: Winbond Electronics Corp., Taichung (TW)

(72) Inventors: Ming-Chih Tsai, Taichung (TW); Yu-Hsuan Ho, Taichung (TW)

(73) Assignee: Winbond Electronics Corp., Taichung (TW)

( * ) Notice: Subject to any disclaimer, the term of this patent is extended or adjusted under 35 U.S.C. 154(b) by 643 days.

(21) Appl. No.: 17/118,619

(22) Filed: Dec. 11, 2020

(65) Prior Publication Data

US 2021/0095100 A1    Apr. 1, 2021

Related U.S. Application Data (63) Continuation of application No. 15/871,027, filed on Jan. 14, 2018, now abandoned.

(30) Foreign Application Priority Data

Jun. 20, 2017   (CN) .......................... 201710468578.3

(51) Int. Cl.
*C08L 1/02*    (2006.01)
*B32B 27/30*   (2006.01)
*C08K 3/08*    (2006.01)
*B82Y 30/00*   (2011.01)
*B82Y 40/00*   (2011.01)

(52) U.S. Cl.
CPC .............. *C08L 1/02* (2013.01); *B32B 27/306* (2013.01); *B32B 27/308* (2013.01); *C08K 3/08* (2013.01); *B82Y 30/00* (2013.01); *B82Y 40/00* (2013.01); *C08K 2003/0806* (2013.01); *C08K 2003/0831* (2013.01); *C08K 2003/085* (2013.01); *C08K 2003/0862* (2013.01); *C08K 2003/0887* (2013.01)

(58) Field of Classification Search
CPC .. C08L 1/02; C08K 3/08; B82Y 30/00; B82Y 40/00
See application file for complete search history.

(56) References Cited

U.S. PATENT DOCUMENTS 9,200,086 B2 * 12/2015 Wan ........................ C08B 15/05
2010/0233245 A1 * 9/2010 Narayana ............... A01N 25/34
424/617

OTHER PUBLICATIONS

Meulendijks, Nicole, Electrically conductive coatings consisting of Ag-decorated cellulose nanocrystals, Mar. 2017, Cellulose, 24, pp. 2191-2204.*

* cited by examiner

*Primary Examiner* — Ling Siu Choi
*Assistant Examiner* — Olga Lucia Donahue
(74) *Attorney, Agent, or Firm* — JCIPRNET (57) ABSTRACT

A composite material including a nanocellulose core and a metal shell is provided. The metal shell covers a surface of the nanocellulose core. The composite material is nanosized and has high mechanical strength. Additionally, a method of manufacturing the composite material is also provided.

19 Claims, 6 Drawing Sheets

COMPOSITE MATERIAL AND METHOD OF MANUFACTURING THE SAME

CROSS-REFERENCE TO RELATED APPLICATION

This application is a continuation application of and claims priority benefit of U.S. patent application Ser. No. 15/871,027, filed on Jan. 14, 2018, which claims the priority benefit of China application serial no. 201710468578.3, filed on Jun. 20, 2017. The entirety of each of the above-mentioned patent applications is hereby incorporated by reference herein and made a part of this specification.

BACKGROUND OF THE INVENTION

Field of the Invention

The invention relates to a material and a method of manufacturing the same, and more particularly, to a composite material and a method of manufacturing the same.

Description of Related Art

With the advancement of technology, printing techniques have also upgraded, wherein printed electronics techniques and applications thereof are quite broad, and include the manufacture of, for instance, nanowires, electrodes, and transparent conducting films.

However, the conductive ink for printing electronics is generally mainly based on nano metal particles or nano metal sheets, and one-dimensional nano metal materials are less used since one-dimensional nano metal materials have a diameter of about tens of nanometers and a length of about several micrometers. If the metal material is too big, then the issue of nozzle blockage may occur in the printing process. Moreover, in known techniques, to form a conductive ink having a small metal material, microchannels need to be first formed in the aluminum oxide layer, and then after the metal material is filled via electrochemical deposition, the aluminum oxide template layer is removed. Therefore, the process steps are more complex. Moreover, the one-dimensional structure of the known techniques often melts and breaks into fragments or melts into particles due to increased temperature such that the original form is lost. As a result, electrical properties are changed and conductive effect is reduced. Therefore, how to alleviate the issue of nozzle blockage, simplify the process, and maintain electrical properties is an object of current study.

SUMMARY OF THE INVENTION

The invention provides a nanosized composite material having high mechanical strength.

The invention provides a method of manufacturing a composite material. The method produces a nanosized composite material having high mechanical strength.

The invention provides a composite material including a nanocellulose core and a metal shell. The metal shell covers a surface of the nanocellulose core.

In some embodiments of the invention, the ratio of the length and the diameter of the composite material is between 1.5:1 and 500:1.

In some embodiments of the invention, the diameter of the composite material is between 2 nanometers and 200 nanometers.

In some embodiments of the invention, the length of the composite material is between 50 nanometers and 5000 nanometers.

In some embodiments of the invention, the material of the nanocellulose core includes cellulose nanofibrils (CNF), cellulose nanocrystals (CNC), bacterial cellulose (BC), or a combination thereof.

In some embodiments of the invention, the nanocellulose core is solid.

In some embodiments of the invention, the diameter of the nanocellulose core is between 2 nanometers and 200 nanometers.

In some embodiments of the invention, the material of the metal shell includes gold, silver, palladium, platinum, ruthenium, copper, tungsten, nickel, aluminum, or a combination thereof.

In some embodiments of the invention, the thickness of the metal shell is between 2 nanometers and 200 nanometers.

The invention provides a method of manufacturing a composite material including the following steps: providing a nanocellulose core; modifying the nanocellulose core; forming metal ions of metal seed generation points on a surface of the modified nanocellulose core; performing a first reduction reaction to reduce the metal ions of the metal seed generation points to form metal seeds; and performing a second reduction reaction to reduce the metal ions of the metal seed generation points at the metal seeds to form a metal shell covering the surface of the modified nanocellulose core.

In some embodiments of the invention, the step of modifying the nanocellulose core includes performing a substitution reaction on the hydroxyl groups on the carbons of the nanocellulose core with a metal to form metal-substituted hydroxyl groups.

In some embodiments of the invention, the metal ions of the metal seed generation points are formed on the metal-substituted hydroxyl groups.

In some embodiments of the invention, the step of modifying the nanocellulose core includes performing a substitution reaction on the nanocellulose core with potassium hydroxide or sodium hydroxide.

In some embodiments of the invention, the reducing agent for performing the first reduction reaction and the second reduction reaction includes ascorbic acid, hydrazine, sodium borohydride, formaldehyde, glucose, sodium citrate, urea, diethanolamine, triethanolamine, methanol, ethanol, ethylene glycol, glycerin, or a combination thereof.

In some embodiments of the invention, the metal ions of the metal seed generation points and the metal precursor for performing the second reduction reaction include silver nitrate, silver nitrite, silver sulfate, silver chloride, silver perchlorate, silver cyanate, silver carbonate, silver acetate, gold sulfite, chlorine acid, chloroplatinic acid, copper nitrate, copper sulfate, copper chloride, nickel sulfate, or a combination thereof.

In some embodiments of the invention, performing the second reduction reaction further includes adding a polymer.

In some embodiments of the invention, the polymer includes polyvinylpyrrolidone (PVP), polyvinyl alcohol (PVA), poly acrylic acid (PAA), or a combination thereof.

In some embodiments of the invention, the reaction temperature for performing the first reduction reaction and the second reduction reaction is between 0 Celsius and 250 Celsius.

In some embodiments of the invention, the material of the metal shell includes gold, silver, palladium, platinum, ruthenium, copper, tungsten, nickel, aluminum, or a combination thereof.

Based on the above, the composite material of the invention includes a nanocellulose core and a metal shell, wherein the metal shell covers a surface of the nanocellulose core. From the structural viewpoint, the size of the composite material of the invention is controlled within the nano range, and therefore the blocking issue caused by large size is effectively alleviated. Moreover, in the composite material of the invention, nanocellulose is used as the core, thus resulting in high crystallinity, and therefore the mechanical strength of the entire composite material is increased. Moreover, the core of the nanocellulose is used as a supportive template to prevent metal melting phenomenon from affecting electrical properties. From the process viewpoint, in the manufacturing process of the composite material of the invention, the metal shell is defined by the nanocellulose core, and a subsequent step of removing the nanocellulose core is not needed, and therefore the process is simpler.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
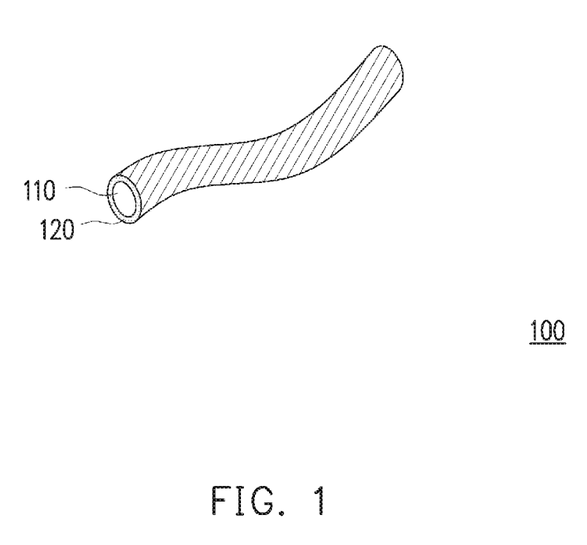
FIG. 1 is a schematic of a composite material shown according to some embodiments of the invention.

FIG. 1 is a schematic of a composite material shown according to some embodiments of the invention.

Referring to FIG. 1, a composite material 100 of the present embodiment includes a nanocellulose core 110 and a metal shell 120. The metal shell 120 covers a surface of the nanocellulose core 110.

<Nanocellulose Core>

The material of the nanocellulose core 110 includes, for instance, plant-based, algae-based, or bacteria-based cellulose nanofibril (CNF), cellulose nanocrystal (CNC), bacterial cellulose (BC), or a combination thereof. In some embodiments, the material of the nanocellulose core 110 is, for instance, crystalline cellulose. In some embodiments, the weight average molecular weight of the nanocellulose core 110 is, for instance, between 500 and 500000. In some embodiments, the diameter of the nanocellulose core 110 is, for instance, between 2 nanometers and 200 nanometers. In some other embodiments, the diameter of the nanocellulose core 110 is, for instance, less than 5 nanometers. In some embodiments, the length of the nanocellulose core 110 is, for instance, between 20 nanometers and 20000 nanometers. In some embodiments, the ratio of the length and the diameter of the nanocellulose core 110 is, for instance, between 10:1 and 1000:1. In some other embodiments, the ratio of the length and the diameter of the nanocellulose core 110 is, for instance, 60:1, but the invention is not limited thereto. The chemical formula of the cellulose is as follows:

<Metal Shell>

The material of the metal shell 120 includes, for instance, a noble metal. In some embodiments, the material of the metal shell 120 includes, for instance, gold, silver, palladium, platinum, ruthenium, copper, tungsten, nickel, aluminum, or a combination thereof. In some embodiments, the thickness of the metal shell 120 is, for instance, between 2 nanometers and 200 nanometers.

<Composite Material>

In some embodiments, the diameter of the composite material 100 formed by the nanocellulose core 110 and the metal shell 120 is, for instance, between 2 nanometers and 200 nanometers. In some embodiments, the length of the composite material 100 is, for instance, between 50 nanometers and 5000 nanometers. In some embodiments, the ratio of the length and the diameter of the composite material 100 is, for instance, between 1.5:1 and 500:1. In some other embodiments, the ratio of the length and the width of the composite material 100 is, for instance, 60:1, but the invention is not limited thereto.

In some embodiments, the nanocellulose core 110 is solid. In other words, since the nanocellulose core 110 is solid, the entire composite material 100 has a hard structure. It should be mentioned that, since the surface of the composite material 100 is covered by the metal shell 120, the entire composite material 100 has conductive properties.

FIG. 2A to FIG. 2E are schematics of the manufacturing process of a composite material shown according to some embodiments of the invention. FIG. 3A to FIG. 3E are respectively schematics of the chemical structure of a surface of the composite material of FIG. 2A to FIG. 2E. FIG. 4 is a flow schematic of the method of manufacturing a composite material shown according to some embodiments of the invention.

Referring to FIG. 2A to FIG. 2E, FIG. 3A to FIG. 3E, and FIG. 3, the method of manufacturing the composite material 100 of the invention includes: providing a nanocellulose core 110a (step S10); modifying the nanocellulose core 110a (step S12); forming metal ions 120a of metal seed generation points on a surface 112b of a modified nanocellulose core 110b (step S14); performing a first reduction reaction to reduce the metal ions 120a of the metal seed generation points to form metal seeds 120b (step S16); and performing a second reduction reaction to reduce the metal ions 120a of the metal seed generation points at the metal seeds to form a metal shell 120 covering the surface of the modified nanocellulose core (step S18). The steps above are described in more detail below.

<Step S10>

Figure 2A:
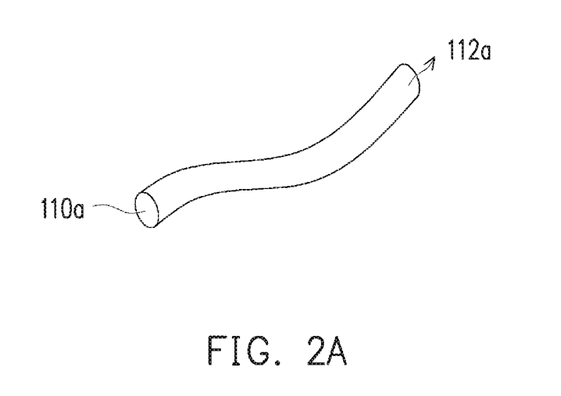
FIG. 2A to FIG. 2E are schematics of the manufacturing process of a composite material shown according to some embodiments of the invention.
Figure 3A:
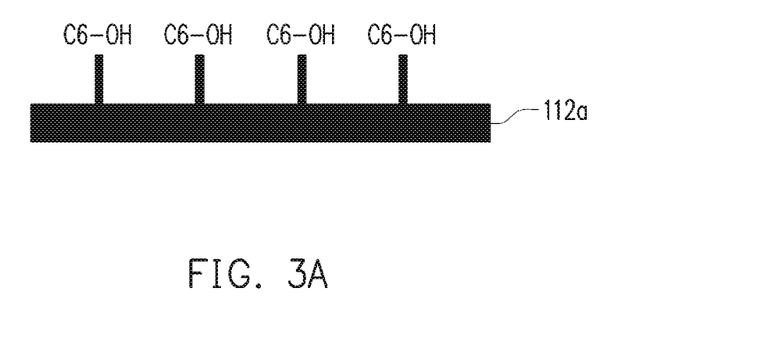
FIG. 3A to FIG. 3E are respectively schematics of the chemical structure of a surface of the composite material of FIG. 2A to FIG. 2E.
Figure 4:
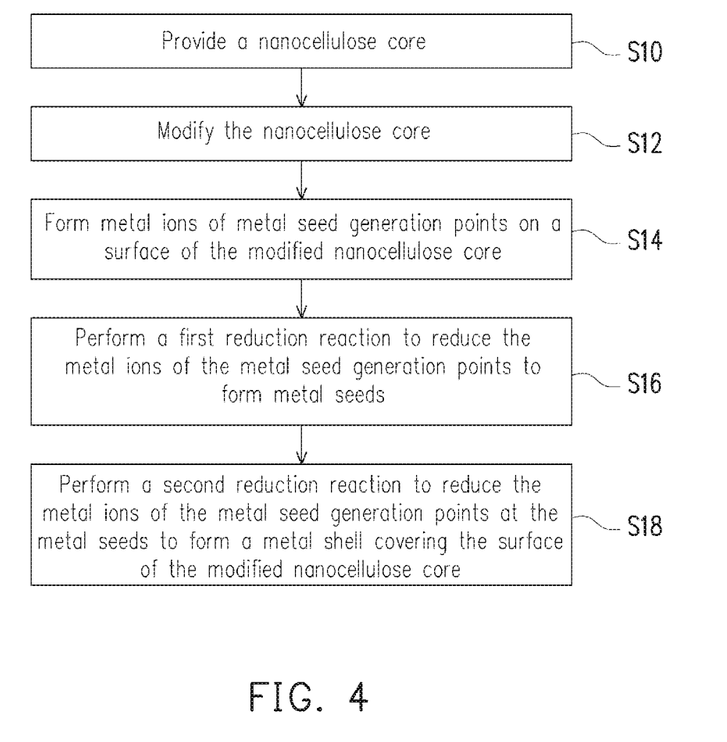
FIG. 4 is a flow schematic of the method of manufacturing a composite material shown according to some embodiments of the invention.

Referring to FIG. 2A, FIG. 3A, and FIG. 4, first, step S10 is performed to provide a nanocellulose core 110a. In some embodiments, the nanocellulose core 110a is formed by, for instance, a physical method, a chemical method, or a combination thereof. For instance, in some embodiments, the nanocellulose core 110a is formed by first processing with a physical method and then processing with a chemical method to obtain a highly-crystalline nanocellulose core 110a. In some embodiments, the physical method includes, for instance, processing with a grinder, homogenizer, or microfluidizer; and the chemical method includes, for instance, a single-step or multi-step hydrolysis reaction, such as sulfuric acid hydrolysis or hydrochloric acid hydrolysis. Conditions of the diameter, length, and material of the nanocellulose core 110a are as provided for the nanocellulose core 110 and are not repeated herein. After the hydrolysis reaction, the carbons of the nanocellulose core 110a have hydroxyl groups. In a specific embodiment, after the hydrolysis reaction of the nanocellulose core 110a, the $C_6$ hydroxyl groups (—OH) are, for instance, primary hydroxyl groups (—$CH_2OH$). In other words, a surface 112a of the nanocellulose core 110a has a plurality of $C_6$ hydroxyl groups of the nanocellulose core (represented by $C_6$—OH) for a subsequent reaction, but the invention is not limited thereto. In the present specification, for ease of explanation, the $C_6$ hydroxyl groups of the nanocellulose core 110a are exemplified, but the invention is not limited thereto.

<Step S12>

Figure 2B:
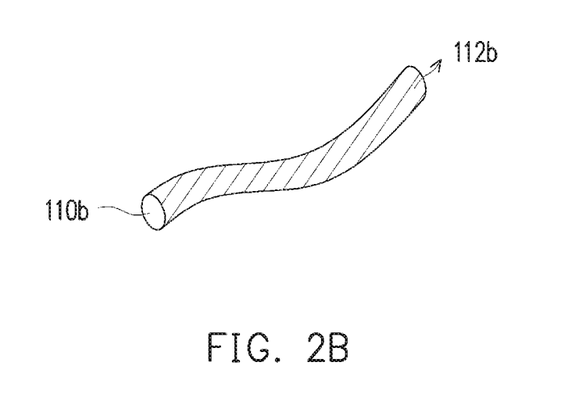
Figure 3B:
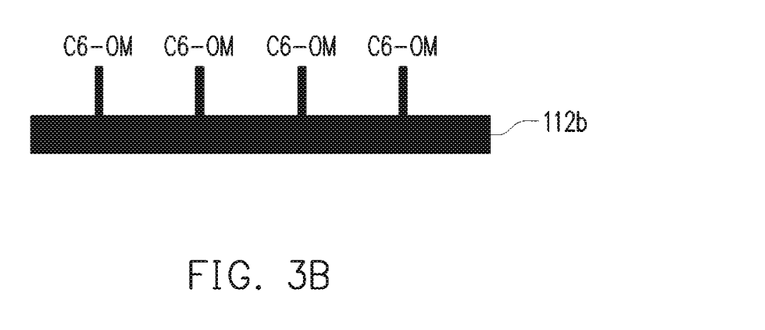

Referring to FIG. 2B, FIG. 3B, and FIG. 4, step S12 is performed to modify the nanocellulose core 110a. In some embodiments, the method of modifying the nanocellulose core 110a includes, for instance, using a metal hydroxide ($M(OH)_n$, wherein M is a metal such as K, and n is the valence of the metal) solution to process the surface 112a of the nanocellulose core 110a, such that the hydrogen of the $C_6$ hydroxyl groups ($C_6$—OH) is substituted by a metal (M) of the metal hydroxide to form OM groups. In other words, the surface 112b of the modified nanocellulose core 110b has OM groups, and the OM groups are bonded to $C_6$ (represented by $C_6$—OM) of the modified nanocellulose core 110b. The OM groups are, for instance, OK.

In some embodiments, the metal hydroxide ($M(OH)_n$) includes, for instance, potassium hydroxide (KOH). In a specific embodiment, the modified nanocellulose core 110a is formed by, for instance, processing the surface 112a of the nanocellulose core 110a with potassium hydroxide to substitute the $C_6$ hydroxyl groups thereof ($C_6$—OH) by OK groups, but the invention is not limited thereto. In some embodiments, the modification of the nanocellulose core 110a does not include a substitution reaction for all of the hydroxyl groups of the nanocellulose core 110a. In other words, only a portion of the hydroxyl groups of the nanocellulose core 110a is subjected to the substitution reaction to form the OM groups, but the invention is not limited thereto.

<Step S14>

Figure 2C:
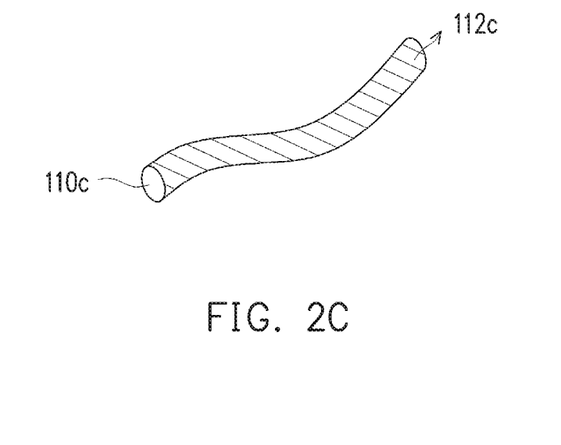
Figure 3C:
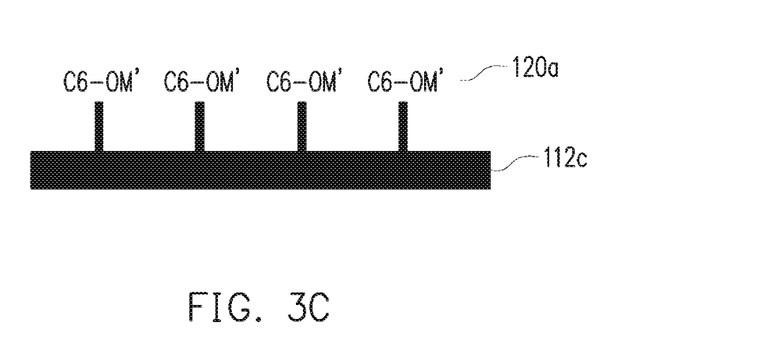

Referring to FIGS. 2C and 3C and FIG. 4, step S14 is performed to form metal ions 120a of a metal seed generation point on the surface 112b of the modified nanocellulose core 110b. In some embodiments, when the surface 112b of the modified nanocellulose core 110b has OM groups, the surface 112b of the modified nanocellulose core 110b is processed using a solution containing a metal precursor (M') such that the OM groups of the surface 112b are replaced by OM' groups. In other words, at this point, a surface 112c of a nanocellulose core 110c has OM' groups, and the OM' groups are bonded to $C_6$ of the nanocellulose core 110c (represented by $C_6$—OM'), and the OM' groups are used as a source for the metal ions of the generation points for the subsequent growth of the metal seeds. The OM' groups are, for instance, OAg.

In some exemplary embodiments, M is, for instance, potassium (K), and M' is, for instance, silver (Ag). In some embodiments, the solution containing the metal precursor M' includes, for instance, silver nitrate ($AgNO_3$), silver nitrite ($AgNO_2$), silver sulfate ($Ag_2SO_4$), silver chloride (AgCl), silver perchlorate ($AgClO_4$), silver cyanate (AgOCN), silver carbonate ($Ag_2CO_3$), silver acetate ($AgC_2H_3O_2$), gold sulfite ($Au(SO_3)_2^{2-}$), chlorine acid ($HAuCl_4$), chloroplatinic acid ($H_2PtCl_6$), copper nitrate ($Cu(NO_3)_2$), copper sulfate ($CuSO_4$), copper chloride ($CuCl_2$), nickel sulfate ($NiSO_4$), or a combination thereof. In a specific embodiment, the surface 112b of the modified nanocellulose core 110b has OK groups, and then the surface 112b of the modified nanocellulose core 110b processed by, for instance, silver nitrate is used, such that the OK groups of the surface thereof are replaced by OAg groups, but the invention is not limited thereto.

<Step S16>

Figure 2D:
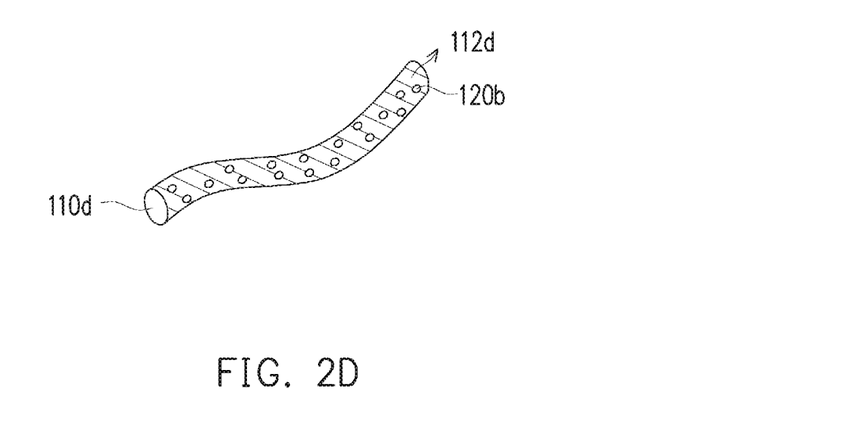
Figure 3D:
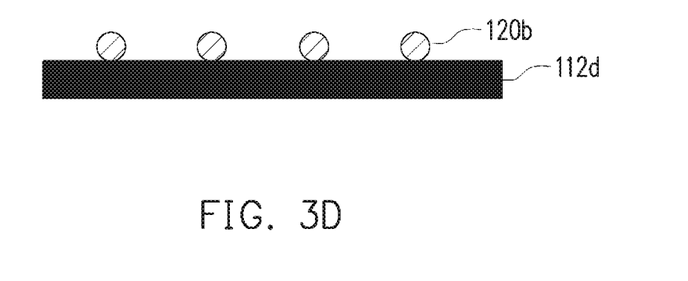

Referring to FIG. 2D, FIG. 3D, and FIG. 4, step S16 is performed to perform a first reduction reaction to reduce the metal ions 120a of the metal seed generation points to form metal (atom) seeds 120b. In other words, a surface 112d of a nanocellulose core 110d has a plurality of metal seeds 120b. In some exemplary embodiments, the plurality of metal seeds 120b is, for instance, silver atom seeds.

In some embodiments, the reducing agent reducing the metal ions 120a of the metal seed generation point is, for instance, ascorbic acid, hydrazine, sodium borohydride, formaldehyde, glucose, sodium citrate, urea, diethanolamine, triethanolamine, methanol, ethanol, ethylene glycol, glycerin, or a combination thereof. In some embodiments, the reaction temperature for reducing the metal ions 120a of the metal seed generation points is, for instance, between 0 Celsius and 250 Celsius, and the reduction reaction is performed in, for instance, an ice bath, a heated environment, or room temperature.

In a specific exemplary embodiment, the surface 112a of the nanocellulose core 110a is processed by potassium hydroxide such that the hydroxyl groups ($C_6$—OH) thereof are substituted by OK groups (step S12). Next, the surface 112b of the modified nanocellulose core 110b is processed with a silver nitrate solution such that the OK groups of the surface 112b thereof are replaced by OAg groups (step S14). Next, using ascorbic acid as the reducing agent, the OAg groups are reduced to Ag atoms as Ag metal seeds (step S16).

<Step S18>

Figure 2E:
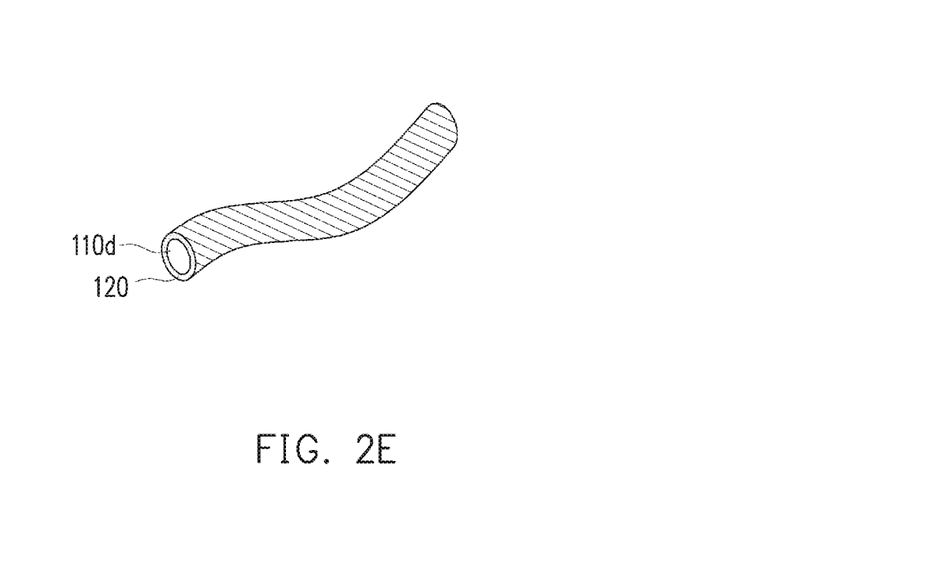
Figure 3E:
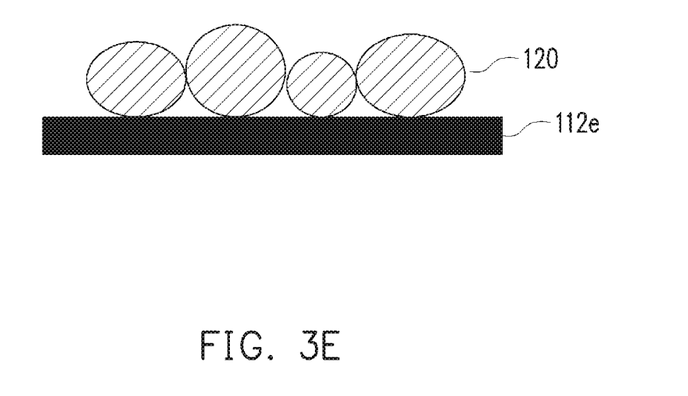

Referring to FIG. 2E, FIG. 3E, and FIG. 4, step S18 is performed to perform a second reduction reaction to reduce the metal seeds 120b to form a metal shell 120 covering the surface of the modified nanocellulose core. In other words, at this point, a surface 112e of the nanocellulose core 110d covers the metal shell 120. Specifically, performing the second reduction reaction includes performing a second metal growth via a metal precursor and a reducing agent using the metal seeds 120b as the growth points, and the types of the metal precursor and the reducing agent and the temperature of the reducing agent are as provided above and are not repeated herein. In some embodiments, the second reducing agent further includes a polymer such as polyvinylpyrrolidone (PVP), polyvinyl alcohol (PVA), poly acrylic acid (PAA), or a combination thereof. Conditions such as the thickness and the material of the metal shell 120 are provided above and are not repeated herein.

The composite material of the invention is used as, for instance, a material in conductive ink. It should be mentioned that, by controlling the size (such as diameter and length) of the nanocellulose core, the entire composite material of the invention is formed in the desired size range. For instance, the length of the composite material is controlled to be between 50 nanometers and 5000 nanometers, and therefore the issue of nozzle blockage of the conductive ink during the printing process is effectively solved. Moreover, in the composite material of the invention, nanocellulose is used as the core, and the nanocellulose has high crystallinity, and therefore the mechanical strength of the entire composite material is increased. Moreover, the core of the nanocellulose is used as a supportive template to prevent metal melting phenomenon from affecting electrical properties.

Moreover, in the manufacturing process of the composite material of the invention, after the nanocellulose core is formed, a metal shell is provided to cover the surface of the nanocellulose core, and a subsequent step of removing the nanocellulose core is not needed. In other words, if the composite material of the invention is used as the material of the conductive ink, then printing is directly performed to form a conductive circuit, and the nanocellulose core does not need to be subsequently removed. As a result, the process is simplified.

Based on the above, the composite material of the invention includes a nanocellulose core and a metal shell, wherein the metal shell covers a surface of the nanocellulose core. From the structural viewpoint, the size of the composite material of the invention is controlled within the nano range, and therefore the blocking issue caused by large size is effectively alleviated. Moreover, in the composite material of the invention, nanocellulose is used as the core, thus resulting in high crystallinity, and therefore the mechanical strength of the entire composite material is increased. Moreover, the core of the nanocellulose is used as a supportive template to prevent metal melting phenomenon from affecting electrical properties. From the process viewpoint, in the manufacturing process of the composite material of the invention, the metal shell is defined by the nanocellulose core, and a subsequent step of removing the nanocellulose core is not needed, and therefore the process is simpler.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A method of manufacturing a composite material, comprising:
   providing a nanocellulose core;
   modifying the nanocellulose core;
   forming metal ions of metal seed generation points on a surface of the modified nanocellulose core;
   performing a first reduction reaction to reduce the metal ions of the metal seed generation points to form metal seeds; and
   performing a second reduction reaction to reduce the metal ions of the metal seed generation points at the metal seeds to form a metal shell covering the surface of the modified nanocellulose core,
   wherein the step of modifying the nanocellulose core comprises performing a substitution reaction on hydroxyl groups on carbons of the nanocellulose core with a metal M to form a metal-substituted hydroxyl group —OM.

2. The method of manufacturing the composite material of claim 1, wherein the metal M comprises potassium.

3. The method of manufacturing the composite material of claim 1, wherein the metal ions of the metal seed generation points are ions of metal M' (M'≠M) and replace ions of the metal M of the metal-substituted hydroxyl groups —OM to form —OM'.

4. The method of manufacturing the composite material of claim 3, wherein the metal M' comprises silver, gold, platinum, copper, nickel, or a combination thereof.

5. The method of manufacturing the composite material of claim 4, wherein the modified nanocellulose core is processed using a solution to form —OM' from —OM, the solution containing $AgNO_3$, $AgNO_2$, $Ag_2SO_4$, $AgCl$, $AgClO_4$, $AgOCN$, $Ag_2CO_3$, $CH_3COOAg$, $Au(SO_3)_2^{2-}$, $HAuCl_4$, $H_2PtCl_6$, $Cu(NO_3)_2$, $CuSO_4$, $CuCl_2$, $NiSO_4$, or a combination thereof.

6. The method of manufacturing the composite material of claim 1, wherein the step of modifying the nanocellulose core comprises performing a substitution reaction on the nanocellulose core with potassium hydroxide.

7. The method of manufacturing the composite material of claim 1, wherein the reducing agent for performing the first reduction reaction and the second reduction reaction comprises ascorbic acid, hydrazine, sodium borohydride, formaldehyde, glucose, sodium citrate, urea, diethanolamine, triethanolamine, methanol, ethanol, ethylene glycol, glycerin, or a combination thereof.

8. The method of manufacturing the composite material of claim 1, wherein the metal ions of the metal seed generation points and a metal precursor for performing the second reduction reaction comprise silver nitrate, silver nitrite, silver sulfate, silver chloride, silver perchlorate, silver cyanate, silver carbonate, silver acetate, gold sulfite, chlorine acid, chloroplatinic acid, copper nitrate, copper sulfate, copper chloride, nickel sulfate, or a combination thereof.

9. The method of manufacturing the composite material of claim 1, wherein performing the second reduction reaction further comprises adding a polymer.

10. The method of manufacturing the composite material of claim 9, wherein the polymer comprises polyvinylpyrrolidone, polyvinyl alcohol, polyacrylic acid, or a combination thereof.

11. The method of manufacturing the composite material of claim 1, wherein a reaction temperature for performing the first reduction reaction and the second reduction reaction is between 0 Celsius and 250 Celsius.

12. The method of manufacturing the composite material of claim 1, wherein a material of the metal shell comprises gold, silver, palladium, platinum, ruthenium, copper, tungsten, nickel, aluminum, or a combination thereof.

13. The method of manufacturing the composite material of claim 1, wherein a ratio of a length and a diameter of the manufactured composite material is between 1.5:1 and 500:1.

14. The method of manufacturing the composite material of claim 1, wherein a diameter of the manufactured composite material is between 2 nanometers and 200 nanometers.

15. The method of manufacturing the composite material of claim 1, wherein a length of the manufactured composite material is between 50 nanometers and 5000 nanometers.

16. The method of manufacturing the composite material of claim 1, wherein a material of the nanocellulose core comprises a cellulose nanofibril, a cellulose nanocrystal, a bacterial cellulose, or a combination thereof.

17. The method of manufacturing the composite material of claim 1, wherein the nanocellulose core is solid.

18. The method of manufacturing the composite material of claim 1, wherein a diameter of the nanocellulose core is between 2 nanometers and 200 nanometers.

19. The method of manufacturing the composite material of claim 1, wherein a thickness of the metal shell is between 2 nanometers and 200 nanometers.

* * * * *